US006882376B2

(12) United States Patent
Kim et al.

(10) Patent No.: US 6,882,376 B2
(45) Date of Patent: Apr. 19, 2005

(54) ARRAY PANEL FOR LIQUID CRYSTAL DISPLAY DEVICE AND METHOD OF MANUFACTURING THE SAME

(75) Inventors: Yong Wan Kim, Kyongsangbuk-do (KR); Dong-Jin Park, Taegu-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 84 days.

(21) Appl. No.: 10/141,085

(22) Filed: May 9, 2002

(65) Prior Publication Data

US 2003/0090601 A1 May 15, 2003

(30) Foreign Application Priority Data

Oct. 25, 2001 (KR) .................. 10-2001-0065911

(51) Int. Cl.[7] .................. G02F 1/136; H01L 31/20; H01L 29/04; H01L 21/00; G09G 3/36
(52) U.S. Cl. .................. 349/43; 257/59; 257/72; 345/92; 438/30; 438/158
(58) Field of Search .................. 349/43, 42; 257/59, 257/72; 345/92; 438/30, 158

(56) References Cited

U.S. PATENT DOCUMENTS 5,668,379 A * 9/1997 Ono et al. .................. 257/59
6,133,977 A * 10/2000 Lee et al. .................. 349/41
6,255,130 B1 * 7/2001 Kim .................. 438/30
6,567,151 B1 * 5/2003 Song .................. 349/187

FOREIGN PATENT DOCUMENTS

JP 406258668 A * 9/1994
JP 410091085 A * 4/1998

* cited by examiner

Primary Examiner—Tarifur R. Chowdhury
Assistant Examiner—Hoan C. Nguyen
(74) Attorney, Agent, or Firm—Morgan Lewis & Bockius LLP

(57) ABSTRACT

An array panel for a liquid crystal display device includes a substrate, a gate line and a gate electrode on the substrate, wherein the gate line is connected to the gate electrode, a gate insulating layer on the gate line and the gate electrode, an active layer on the gate insulating layer, an ohmic contact layer on the active layer, a data line, a source electrode, and a drain electrode on the ohmic contact layer, wherein the data line, the source electrode, and the drain electrode are formed of molybdenum, a passivation layer on the data line, the source and drain electrodes, and a pixel electrode on the passivation layer, wherein the ohmic contact layer has the same shape as the data line, the source, and drain electrodes, and the active layer has the same shape as the data line, and the source electrode, and the drain electrode except for a channel area between the source electrode and the drain electrode, and the channel area has a "U" shape.

7 Claims, 14 Drawing Sheets

ARRAY PANEL FOR LIQUID CRYSTAL DISPLAY DEVICE AND METHOD OF MANUFACTURING THE SAME

This application claims the benefit of the Korean Patent Application No. P2001-065911 filed on Oct. 25, 2001, which is hereby incorporated by reference.

BACKGROUND OF THE INVENTION

1. Field of the Invention

The present invention relates to a liquid crystal display (LCD) device and more particularly, to an array panel for a liquid crystal display device and a method of manufacturing the same.

2. Discussion of the Related Art

A flat panel display device has been widely used because it is thin and light in weight and requires low power consumption. The flat panel display device may be classified into two types by light emission. One is a light-emitting display device that emits light to display images and the other is a light-receiving display device that uses an external light source to display images. Plasma display panels (PDPs), field emission display (FED) devices and electro luminescence (EL) display devices are examples of the light-emitting display devices and a liquid crystal display (LCD) device is an example of the light-receiving display device. The liquid crystal display device has been widely used for notebook computers and desktop monitors, etc. because of its superior resolution, color image display, and quality of displayed images.

Generally, the liquid crystal display (LCD) device has upper and lower substrates, which are spaced apart and facing into each other. Electrodes formed on the substrates are facing each other. A liquid crystal is interposed between the upper substrate and the lower substrate. A voltage is applied to the liquid crystal through the electrodes of each substrate, and thus an alignment of the liquid crystal molecules is changed according the applied voltage to display images. Because the liquid crystal display device does not emit light as described above, it needs a light source to display images. Accordingly, the liquid crystal display device has a backlight behind a liquid crystal panel as a light source. An amount of light incident from the backlight is controlled according the alignment of the liquid crystal molecules to display images.

An active matrix LCD device, which has pixels in a matrix type, has been widely used because of high resolution and fast moving images. An array panel of the active matrix LCD device includes a plurality of thin film transistors (TFTs) and a plurality of pixel electrodes, each of which connects with each of TFTs.

The array panel for a conventional active matrix liquid crystal display device will be described hereinafter in detail with reference to FIGS. 1 and 2.

FIG. 1 is a plane view of an array panel for a conventional LCD device, and FIG. 2 is a cross-sectional view along line II—II of FIG. 1. In FIGS. 1 and 2, the array panel includes a transparent substrate 10, and a gate line 21 and a gate electrode 22 are formed on the substrate 10. The gate line 21 is extended horizontally and the gate electrode 22 is connected to the gate line 21. A gate insulating layer 30 covers the gate line 21 and the gate electrode 22. An active layer 41 and an ohmic contact layer 51 and 52 are formed on the gate insulating layer 30 in this order. A data line 61, a source electrode 62, and a drain electrode 63 are formed on the ohmic contact layer 51 and 52. Also, a capacitor electrode 65, which is made of the same material as the data line 61, is formed on the gate insulator 30. The data line 61 is perpendicular to the gate line 21, and the source electrode 62 is connected to the data line 61. The source and drain electrodes 62 and 63 are spaced apart from each other on the gate electrode 22. The capacitor electrode 65 overlaps a portion of the gate line 21, and then a storage capacitor is obtained by forming the capacitor electrode 65 and the overlapped gate line 21.

A passivation layer 70 covers the data line 61, the source electrode 62, the drain electrode 63, and the capacitor electrode 65. The passivation layer 70 has a first contact hole 71 and a second contact hole 72 that expose the drain electrode 63 and the capacitor electrode 65, respectively.

A pixel electrode 81 is formed on the passivation layer 70. The pixel electrode 81 is disposed at the pixel area where the gate line 21 and the data line 61 are crossed to each other. Also, the pixel electrode 81 is connected to the drain electrode 62 and the capacitor electrode 65 through the first and second contact hole 71 and 72, respectively.

FIGS. 3A to 3E illustrate a manufacturing process of an array panel for the conventional LCD device, and are cross-sectional views corresponding to line II—II of FIG. 1.

FIG. 3A shows the first step of manufacturing the array panel for the conventional LCD device. In FIG. 3A, a gate line 21 and a gate electrode 22 are formed on a substrate 10 by depositing a metal material on the substrate 10 and patterning the metal material by the first mask.

FIG. 3B illustrates the next step of manufacturing the array panel for the conventional LCD device. In FIG. 3B, a gate insulating layer 30, an amorphous silicon layer and an doped amorphous silicon layer are deposited on the substrate 10 including the gate line 21. The amorphous silicon layer and the doped amorphous silicon layer are etched in a photolithography process using the second mask. Then, an active layer 41 and a doped semiconductor layer 53 are formed thereon.

FIG. 3C shows the step of forming a data line of the array panel for the conventional LCD device. In FIG. 3C, a metal layer is deposited on the substrate 10 including the active layer 41 and the doped semiconductor layer 53, and patterned by the third mask. Therefore, a data line 61 (shown in FIG. 1), a source electrode 62, a drain electrode 63, and a capacitor electrode 65 are formed thereon. Next, the doped semiconductor layer 53, which is exposed between the source electrode 62 and the drain electrode 63, is etched. An ohmic contact layer 51 and 52 is then completed in this step.

FIG. 3D shows the step of forming a passivation layer of the array panel for the conventional LCD device. In FIG. 3D, a passivation layer 70 is formed to cover the data line 61, the source electrode 62, the drain electrode 63, and the capacitor electrode 65. And, the passivation layer 70 is etched using the fourth mask. Therefore, the passivation layer 70 has a first contact hole 71 and a second contact hole 72. The first contact hole 71 and the second contact hole 72 expose the drain electrode 63 and the capacitor electrode 65, respectively.

FIG. 3E illustrates the step of forming a pixel electrode of the array panel for the conventional LCD device. In FIG. 3E, a transparent conductive material is deposited on the passivation layer 70 and etched using the fifth mask, and then a pixel electrode 81 is formed. The pixel electrode 81 is connected to the drain electrode 63 and the capacitor electrode 65 through the first and second contact holes 71 and 72, respectively.

As described above, the array panel for the conventional LCD device is fabricated through the photolithography processes using five masks. The photolithography process includes several steps of cleaning, coating a photo-resist layer, exposing through a mask, developing the photo-resist layer, and etching. Therefore, fabricating time, costs, and failure may be decreased by reducing the number of the photolithography process.

SUMMARY OF THE INVENTION

Accordingly, the present invention is directed to an array panel for a liquid crystal display device and a method of manufacturing the same that substantially obviates one or more of problems due to limitations and disadvantages of the related art.

Another object of the present invention is to provide an array panel for a liquid crystal display device that is fabricated in a short period of time with a lower cost.

Another object of the present invention is to provide a manufacturing method of the array panel that increases productivity because of the shorter processes and the lower cost.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array panel for a liquid crystal display device includes a substrate, a gate line and a gate electrode on the substrate, wherein the gate line is connected to the gate electrode, a gate insulating layer on the gate line and the gate electrode, an active layer on the gate insulating layer, an ohmic contact layer on the active layer, a data line, a source electrode, and a drain electrode on the ohmic contact layer, wherein the data line, the source electrode, and the drain electrode are formed of molybdenum, a passivation layer on the data line, the source electrode, and the drain electrode, and a pixel electrode on the passivation layer, wherein the ohmic contact layer has the same shape as the data line, the source electrode, and the drain electrode, and the active layer has the same shape as the data line, the source electrode, and the drain electrode except for a channel area between the source electrode and the drain electrode, and the channel area has a "U" shape.

In another aspect of the present invention, a method of manufacturing an array panel for a liquid crystal display device includes forming a gate line and a gate electrode on a substrate, forming a gate insulating layer on the gate line and the gate electrode, forming an active layer on the gate insulating layer, forming ohmic contact layer on the active layer, forming a data line, a source electrode, and a drain electrode on the ohmic contact layer, wherein the data line, the source electrode, and the drain electrode are formed of molybdenum, forming a passivation layer on the data line, the source electrode, and the drain electrode, and forming a pixel electrode on the passivation layer, wherein the ohmic contact layer has the same shape as the data line, the source electrode, and the drain electrode, and the active layer has the same shape as the data line, the source electrode, and the drain electrode except for a channel area between the source electrode and the drain electrode, and the channel area has a "U" shape.

In another aspect of the present invention, a method of manufacturing an array panel for a liquid crystal display device includes steps of forming a gate line and a gate electrode on a substrate using a first mask, forming a gate insulating layer, an amorphous silicon layer, a doped amorphous silicon layer, and a metal layer on the substrate in this order, forming an active layer, an ohmic contact layer, a data line, a source electrode, and a drain electrode using a second mask, forming a passivation layer using a third mask, and forming a pixel electrode on the passivation layer using a fourth mask, wherein a channel area between the source electrode and the drain electrode has a "U" shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
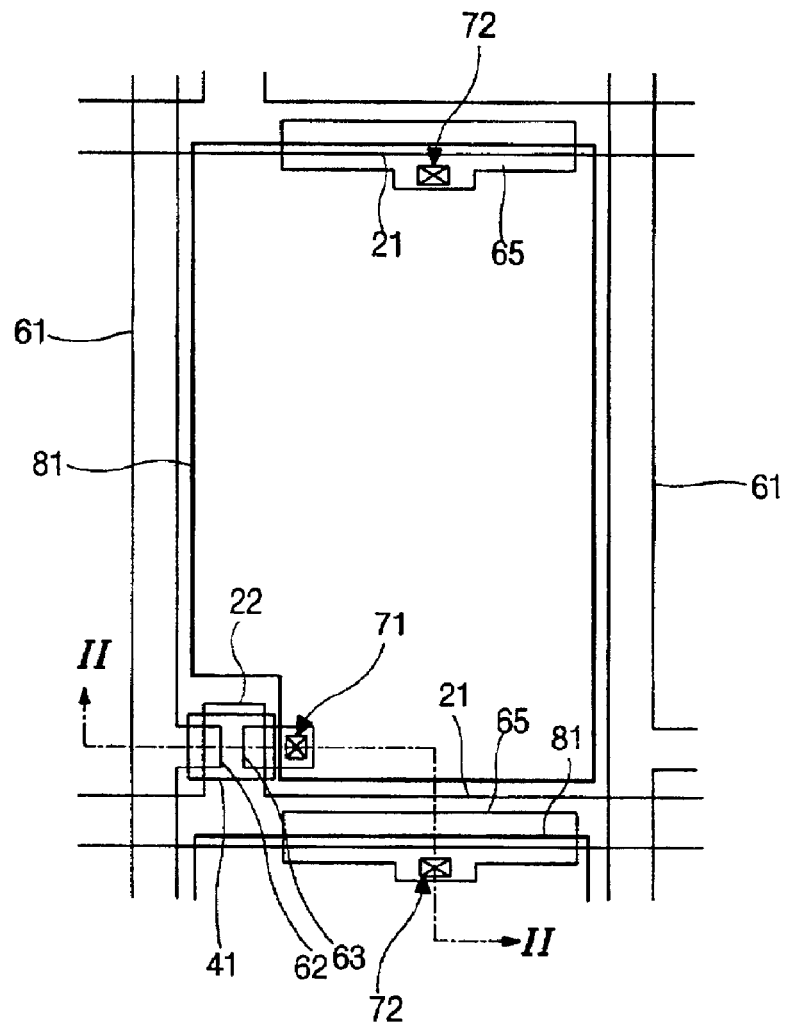
FIG. 1 is a plane view of an array panel for a conventional liquid crystal display device.
Figure 2:
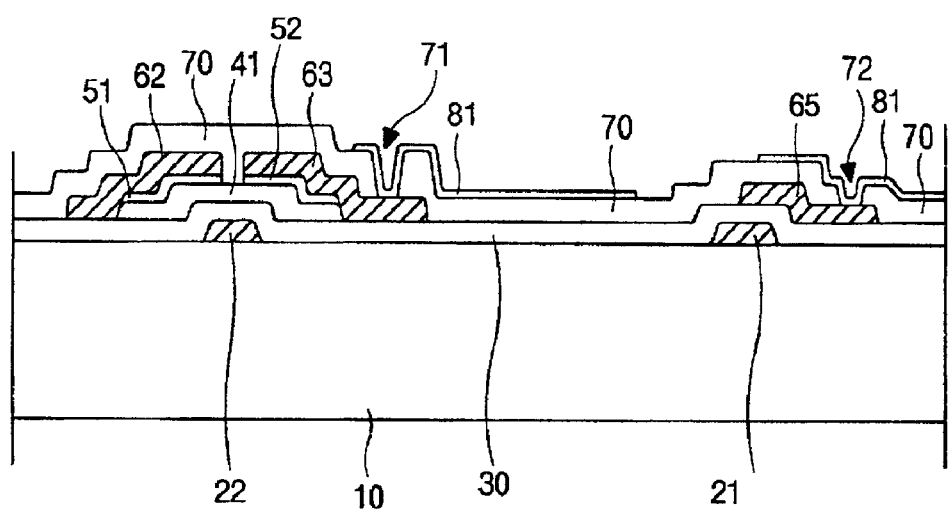
FIG. 2 is a cross-sectional view along line II—II of FIG. 1.
Figure 3A:
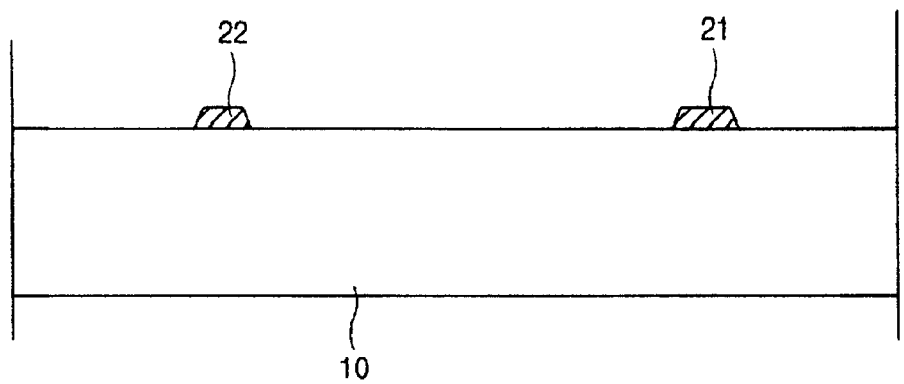
FIGS. 3A to 3E are cross-sectional views illustrating a manufacturing process of an array panel for the conventional liquid crystal display device.
Figure 3B:
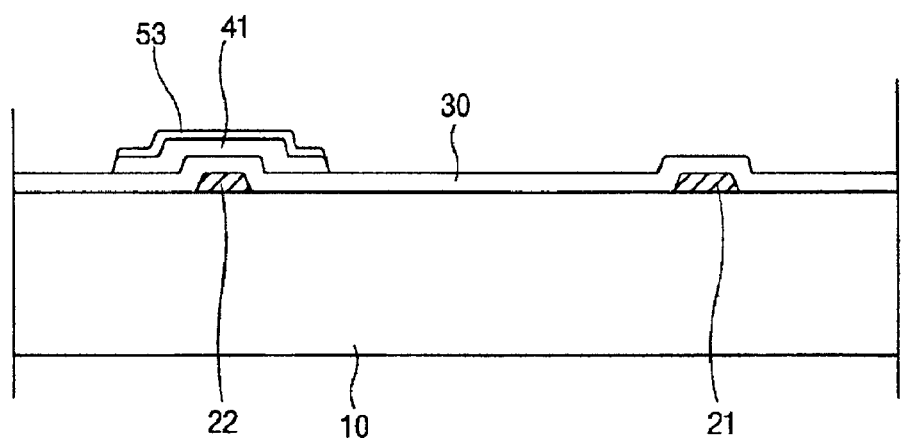
Figure 3C:
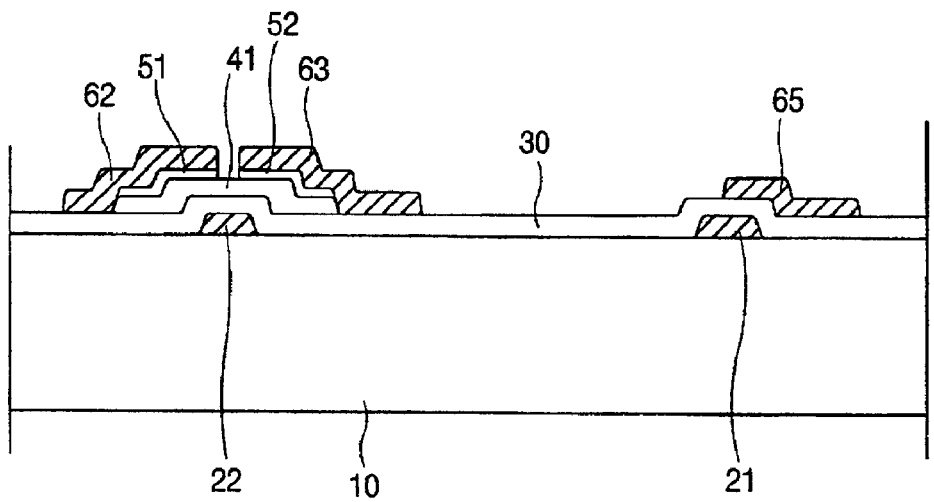
Figure 3D:
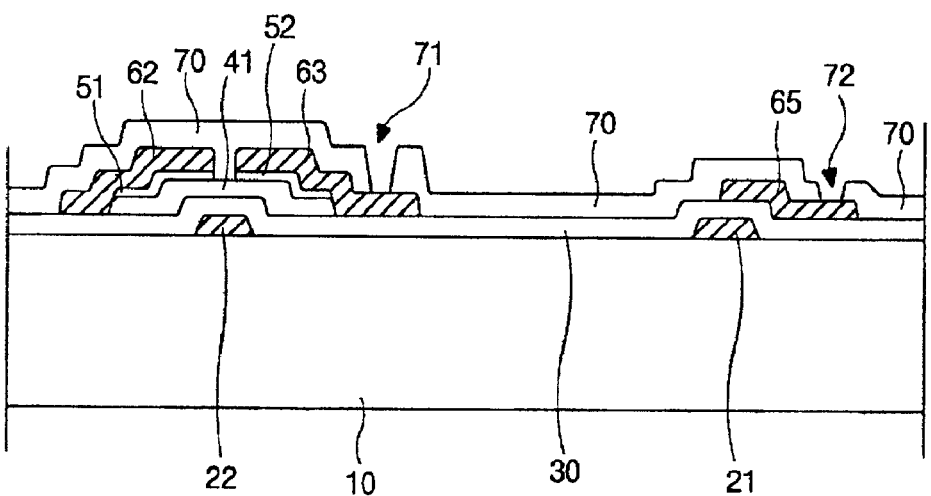
Figure 3E:
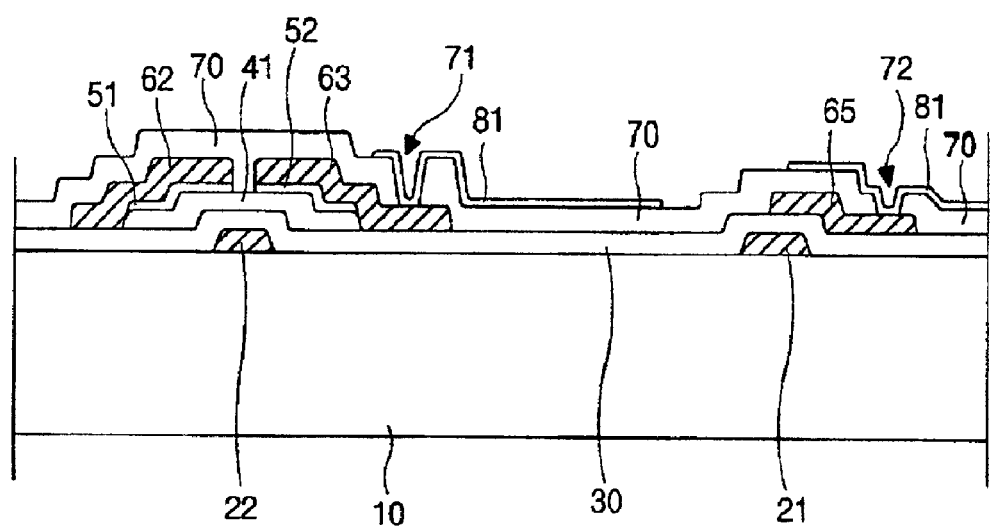
Figure 4:
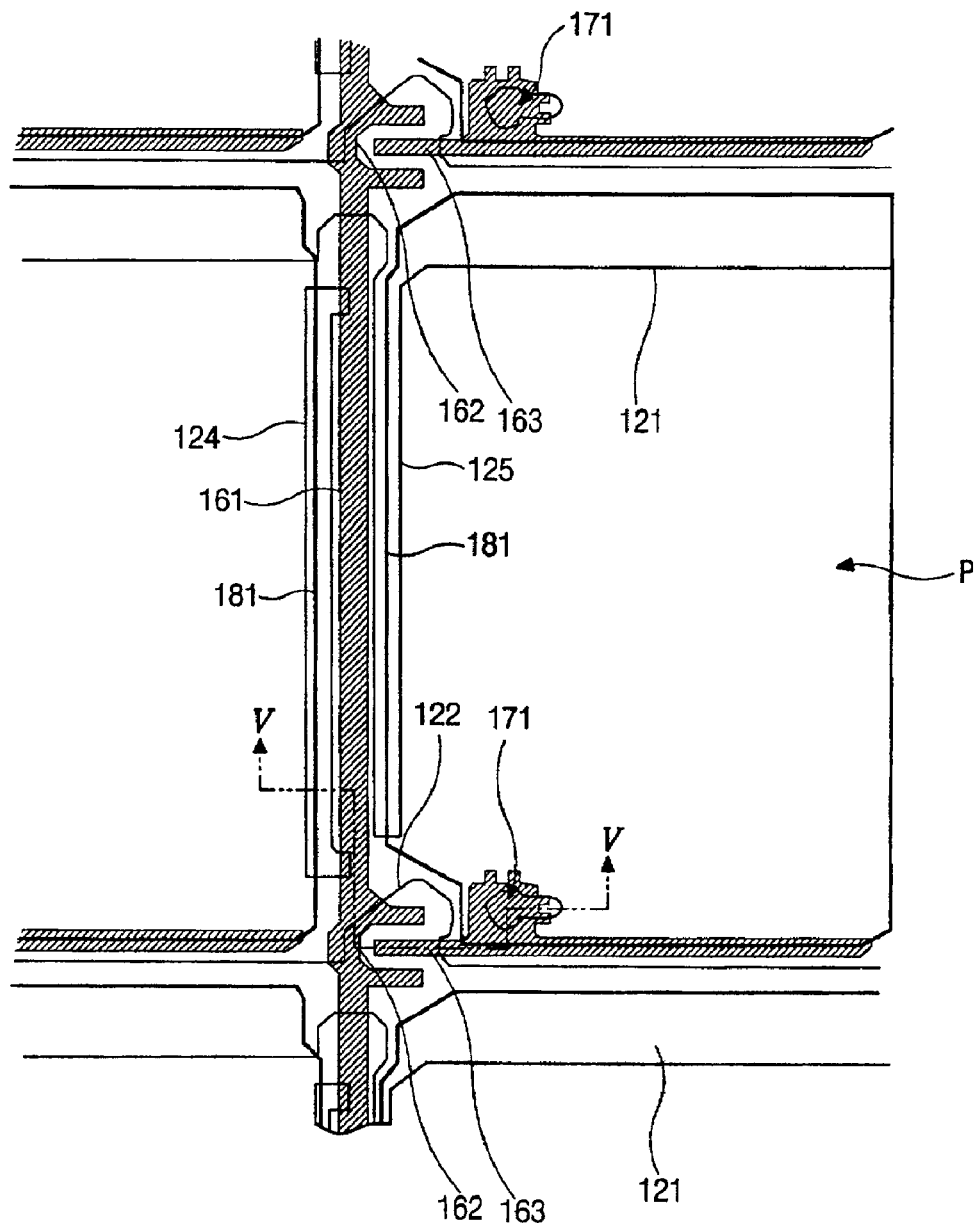
FIG. 4 is a plane view of an array panel for a liquid crystal display device according to the present invention.
Figure 5:
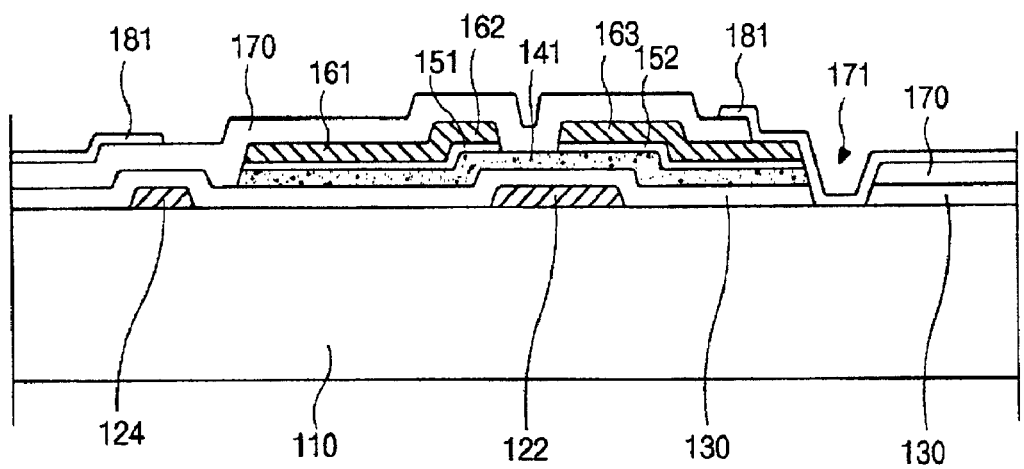
FIG. 5 is a cross-sectional view along line V—V of FIG. 4.

FIG. 4 is a plane view of an array panel for a liquid crystal display device according to the present invention, and FIG. 5 is a cross-sectional view along line V—V of FIG. 4.

As shown in the FIGS. 4 and 5, a gate line 121, a gate electrode 122, a first shielding pattern 124 (i.e., a first light shielding pattern and a second shielding pattern 125 (i.e., a first light shielding pattern) are formed on a substrate 110. The gate line 121 is extended horizontally, and the gate electrode 122 is connected to the gate line 121. The first and second shielding patterns 124 and 125 are extended vertically between the gate lines 121. The first shielding pattern 124 is separated from others while the second shielding pattern 125 is connected to the gate line 121. The first shielding pattern 124 has two projecting parts facing towards the second shielding pattern 125 at both ends. The gate line 121 also has a concave part at the region corresponding to the gate electrode 122.

A gate insulating layer 130 is formed to cover the gate line 121, the gate electrode 122, the first shielding pattern 124, and the second shielding pattern 125.

An active layer 141 is formed on the gate insulating layer 130 and the active layer 141 is disposed on the gate electrode 122. Next, an ohmic contact layer 151 and 152 is formed on the active layer 141.

A data line 161, a source electrode 162, and a drain electrode 163 are formed on the ohmic contact layer 151 and 152 by depositing and patterning a molybdenum (Mo) layer, for example. The data line 161 is extended vertically and defines the pixel region "P" by intersecting the gate line 122. The source electrode 162 is connected to the data line 161 and is a "U" shape. The "U" shape is substantially completely symmetrical. The drain electrode 163 is separated from the source electrode 162 and has first and second parts. The first part is extended horizontally, while the second part is extended from the first part, and facing toward the pixel region "P". One end of the first part is surrounded by the source electrode 162, and thus a channel of a thin film transistor, which is defined as the active layer 141 disposed between the source electrode 162 and the drain electrode 163, has a "U" shape.

Meantime, the second part of the drain electrode 162 has protrusions in order to expand the contacted area to a pixel electrode to be formed later. Also, the data line 161 overlaps the projection parts of the first shielding pattern 124. When the data line 161 is disconnected, the data line 161 is short-circuited with the projection portions of the first shielding pattern 124 by a laser beam. Therefore, even if the data line 161 is disconnected, a signal can be transmitted through the first shielding pattern 124.

Here, the ohmic contact layer 151 and 152 has the same shape as the data line 161, the source electrode 162, and the drain electrode 163, while the active layer 141 has the same shape as the data line 161, the source electrode 162, and the drain electrode 163 except for the channel region.

Next, a passivation layer 170 is formed to cover the data line 161, the source electrode 162, and the drain electrode 163. The passivation layer 170 has a contact hole 171 exposing the drain electrode 163 in the gate insulating layer 130. The contact hole 171 also exposes one sidewall of the drain electrode 163.

A pixel electrode 181 is formed on the passivation layer 170. The pixel electrode 181 is disposed in the pixel region "P" and is made of a transparent conductive material. The pixel electrode 181 is connected to the drain electrode 163 through the contact hole 171, and overlaps the previous gate line 121 to form a storage capacitor. Also, the pixel electrode 181 overlaps the first shielding pattern 124, the second shielding pattern 125, and the first part of the drain electrode 163. Due to this structure, an aligning margin is enlarged, and thus a light leakage may be blocked effectively.

The array panel for the liquid crystal display device according to the present invention is manufactured using four masks. The manufacturing process of the array panel will be described hereinafter in detail with reference to FIGS. 6A and 6B, FIGS. 7A to 7E, FIGS. 8A and 8B, and FIGS. 4 and 5.

Figure 6A:
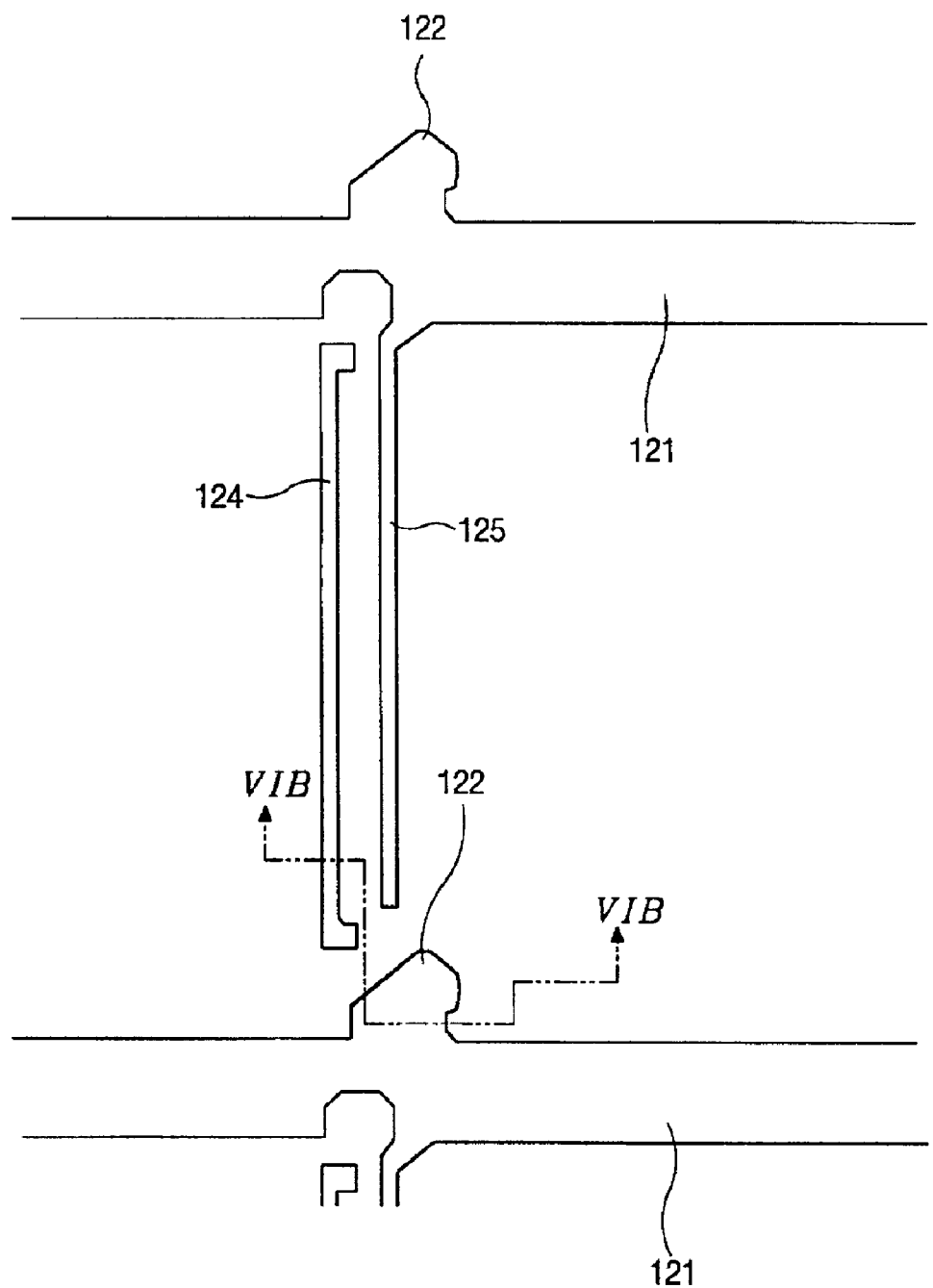
FIGS. 6A and 6B, FIGS. 7A to 7E, and FIGS. 8A and 8B illustrate a manufacturing process of an array panel for a liquid crystal display device according to the present invention.
Figure 6B:
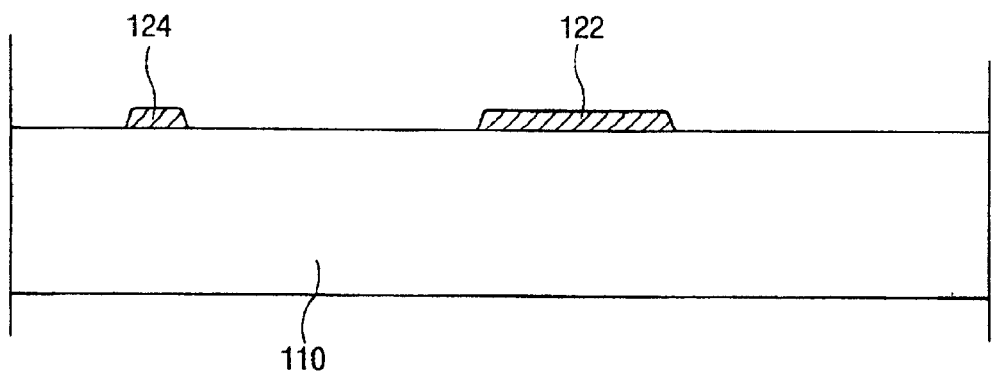

FIGS. 6A and 6B illustrate the step of manufacturing the array panel according to the present invention. FIG. 6A is a plane view showing the manufacturing step of the array panel, and FIG. 6B is a cross-sectional view along line VIB—VIB of FIG. 6A.

In FIGS. 6A and 6B, a gate line 121, a gate electrode 122, a first shielding pattern 124, and a second shielding pattern 125 are formed on a substrate 110 by depositing a metallic material and patterning the metallic material using the first mask. The substrate 110 is made of a transparent substrate such as a glass substrate and the metallic material is made of a low resistive material. For example, the metallic material includes chromium (Cr) or aluminum (Al), and thus the gate line 121 may be formed of chromium, aluminum or an alloy of the chromium and the aluminum.

Here, the gate line 121 is extended horizontally and the gate electrode 122 is extended from the gate line 121. The first and second shielding patterns 124 and 125 are formed in the vertical direction, and the second shielding pattern 125 is connected to the gate line 121. The first shielding pattern 124 has two projection parts facing toward the second shielding pattern 125 at both ends. The gate line 121 has a concave part at the region corresponding to the gate electrode 122.

Figure 7A:
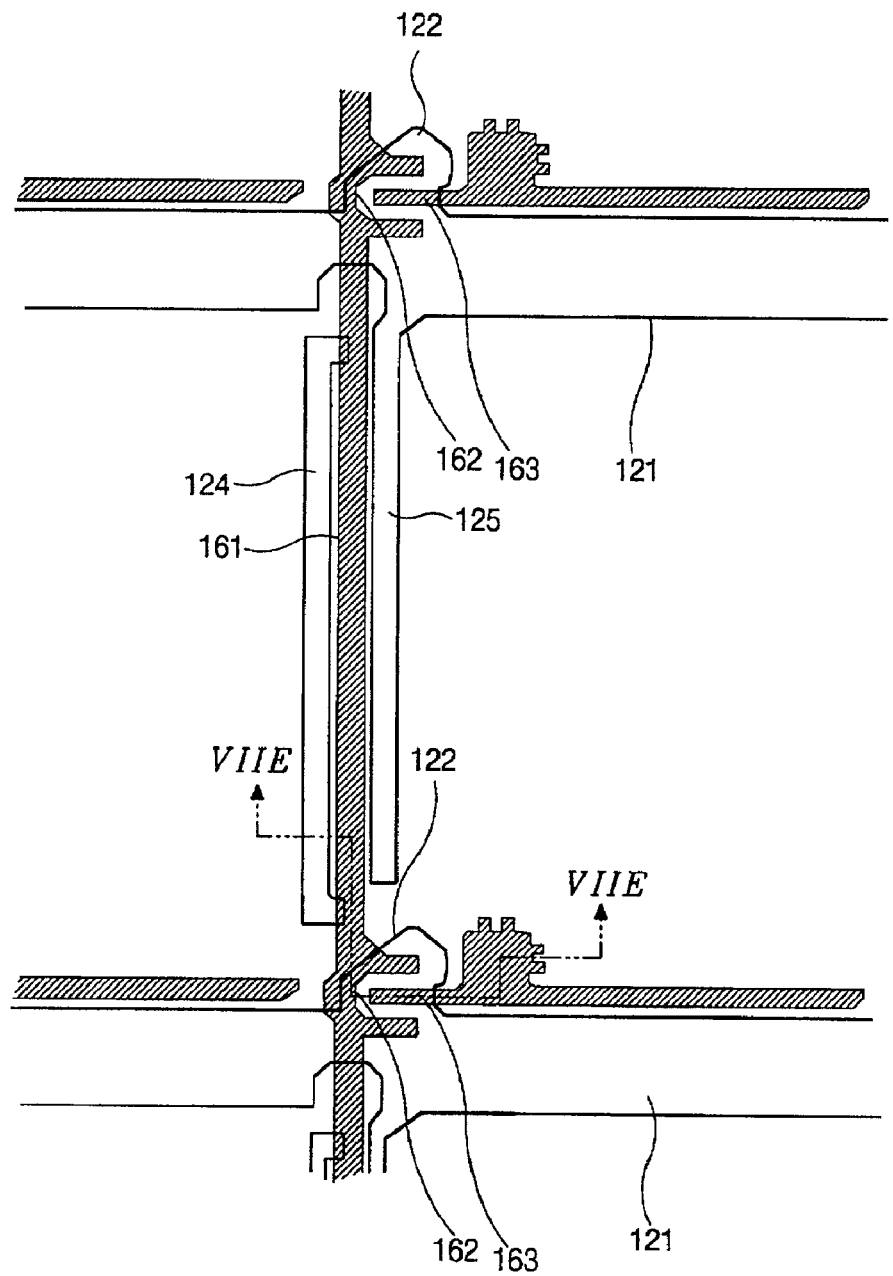

FIGS. 7A to 7E show other steps of manufacturing the array panel according to the present invention. FIG. 7A is a plane view of the step of manufacturing the array panel according to the present invention, and FIGS. 7B to 7E are cross-sectional views along line VIIE—VIIE of FIG. 7A.

Figure 7B:
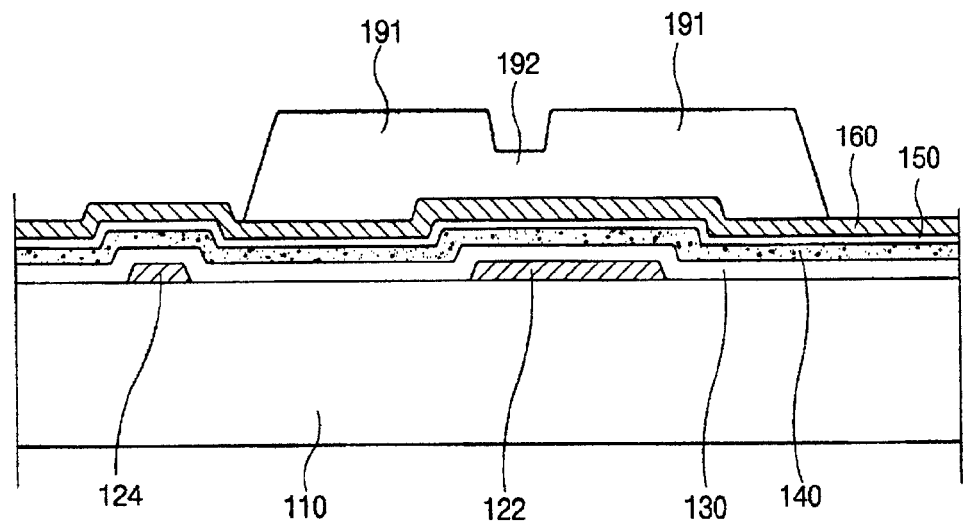

In FIG. 7B, a gate insulating layer 130, an amorphous silicon layer 140 and a doped amorphous silicon layer 150 are deposited on the substrate 110 including the gate electrode 122 and the first shielding pattern 124 in this order. A metal layer 160 is formed on the doped amorphous silicon layer 150 by a sputtering method. Photo-resist patterns 191 and 192 are then formed on the metal layer 160 by coating a photo-resist layer, and exposing and developing the photo-resist layer. The first photo-resist pattern 191 is disposed at the first region, where source and drain electrodes are to be formed later. The second photo-resist pattern 192 is posited on the second region, where a channel between the source and drain electrodes is to be formed later. The first photo-resist pattern 191 has a thickness greater than that of the second photo-resist pattern 192. There is no photo-resist pattern formed thereon except for the first and second regions.

Figure 9:
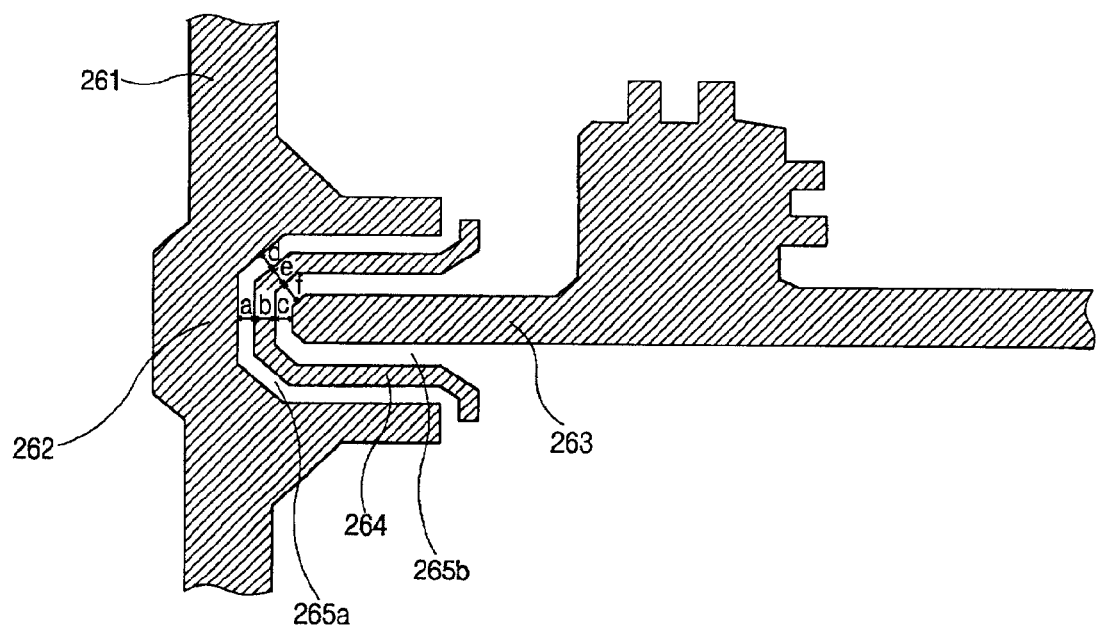
FIG. 9 is showing a mask shape according to the present invention.

A mask having a fine pattern is needed in order to form photo-resist patterns having different thickness at one time as shown in FIG. 7B. FIG. 9 shows a part of the second mask according to the present invention.

In FIG. 9, a second mask 200 includes blocking patterns 261, 262 and 263 and a fine pattern 264. The blocking patterns 261, 262 and 263 correspond to a data line, a source electrode and a drain electrode to be formed later. The fine pattern 264 corresponds to a channel to be formed later. The fine pattern 264 and the blocking patterns are formed to have inner and outer slits 265a and 265b at the channel area. The fine pattern 264 and slits 265a and 265b have a width narrower than a resolution of the exposer.

Therefore, in the second region of FIG. 7B corresponding to the slits 265a and 265b and the fine pattern 264 of the mask 200 of FIG. 9, since the exposed light has a low energy density by diffraction, the thickness of the second photo-resist pattern 192 becomes smaller than that of the first photo-resist pattern 191. The light transmitted through the slits 265a and 265b has a shape of spherical wave. Thus, the fine pattern 264 and the slits 265a and 265b are substantially formed in a "U" shape for the reproducibility of the pattern. The "U" shape of the pattern is substantially completely symmetrical.

In FIG. 9, a width "b" and "e" of the fine pattern 264 is 1.5 μm, and the widths "a", "c" and "d" of the slits 265a and 265b are 1.3 µm. At this time, the corner width "f" of the slit 265b neighboring the drain electrode is 1.1 µm that is narrower than those of the slits at "a", "c" and "d" so that a channel width becomes constant.

Figure 7C:
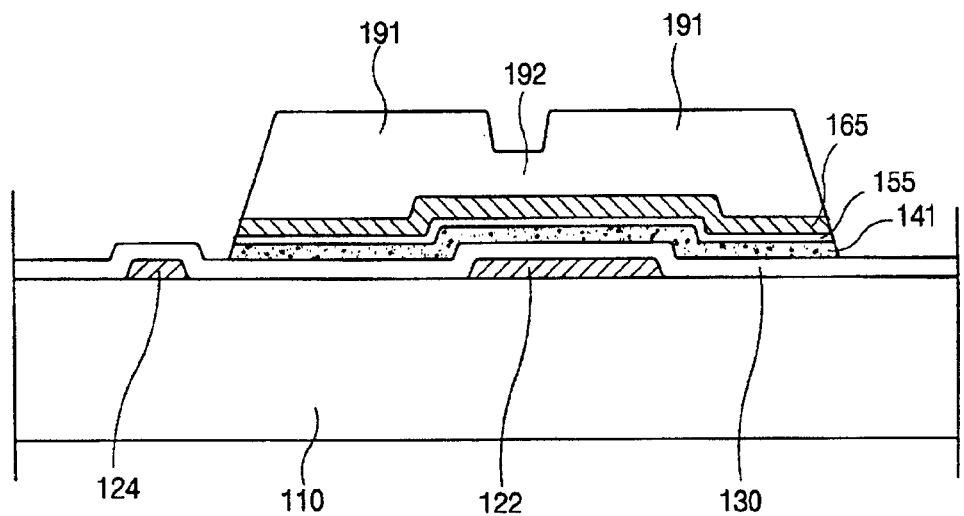

As shown in FIG. 7C, a conductive layer 165, a doped semiconductor layer 155, and semiconductor layer 141 are formed by etching the metal layer 160, the doped amorphous silicon layer 150 and the amorphous silicon layer 140 of FIG. 7B that are not covered with the photo-resist patterns 191 and 192. Here, the semiconductor layer 141 becomes an active layer.

Figure 7D:
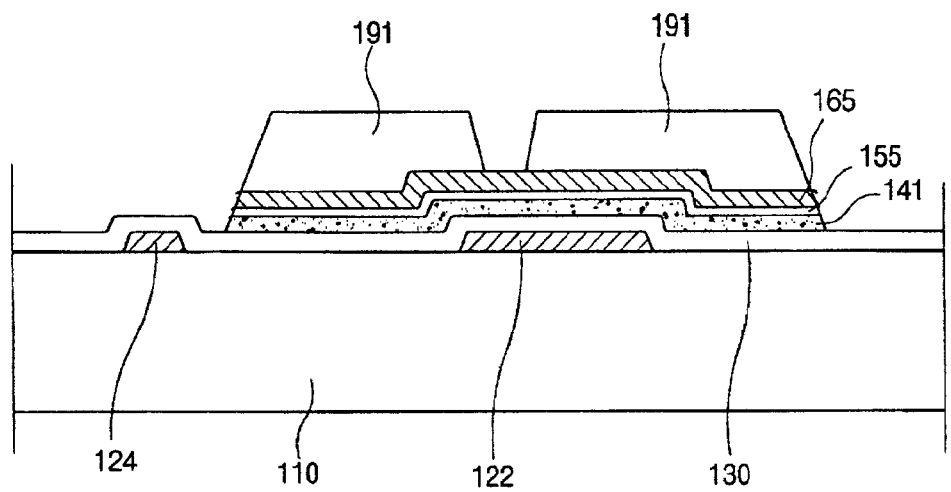

In FIG. 7D, the second photo-resist pattern 192 of FIG. 7C is removed by an ashing method using oxygen (O$_2$) gas. In this process, the first photo-resist pattern 191 is also removed. Accordingly, the thickness of the photo-resist pattern 191 may be reduced.

Figure 7E:
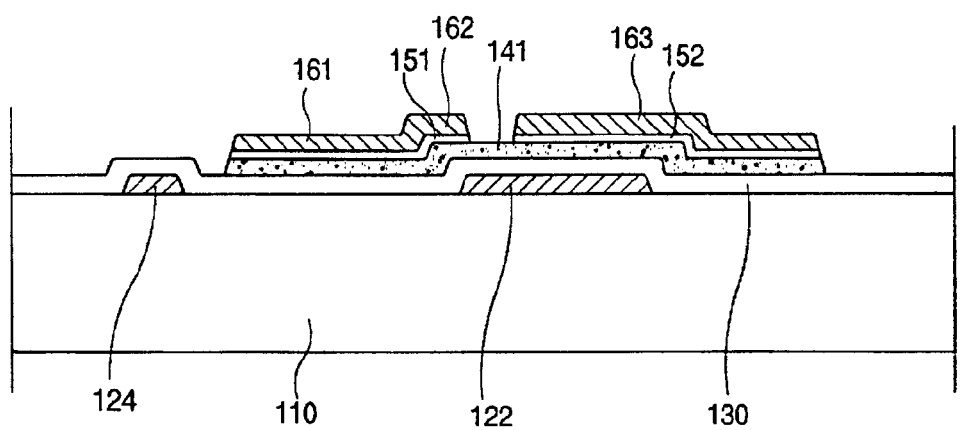

In FIG. 7E, a data line 161, a source electrode 162, a drain electrode 163, and an ohmic contact layer 151 and 152 are formed by etching the exposed conductive layer 165 and the doped semiconductor layer 155 of FIG. 7D under the exposed conductive layer 165. The remaining first photo-resist pattern 191 of FIG. 7D is removed. For example, the data line 161, the source electrode 162, and the drain electrode 163 may be formed of molybdenum (Mo).

Figure 8A:
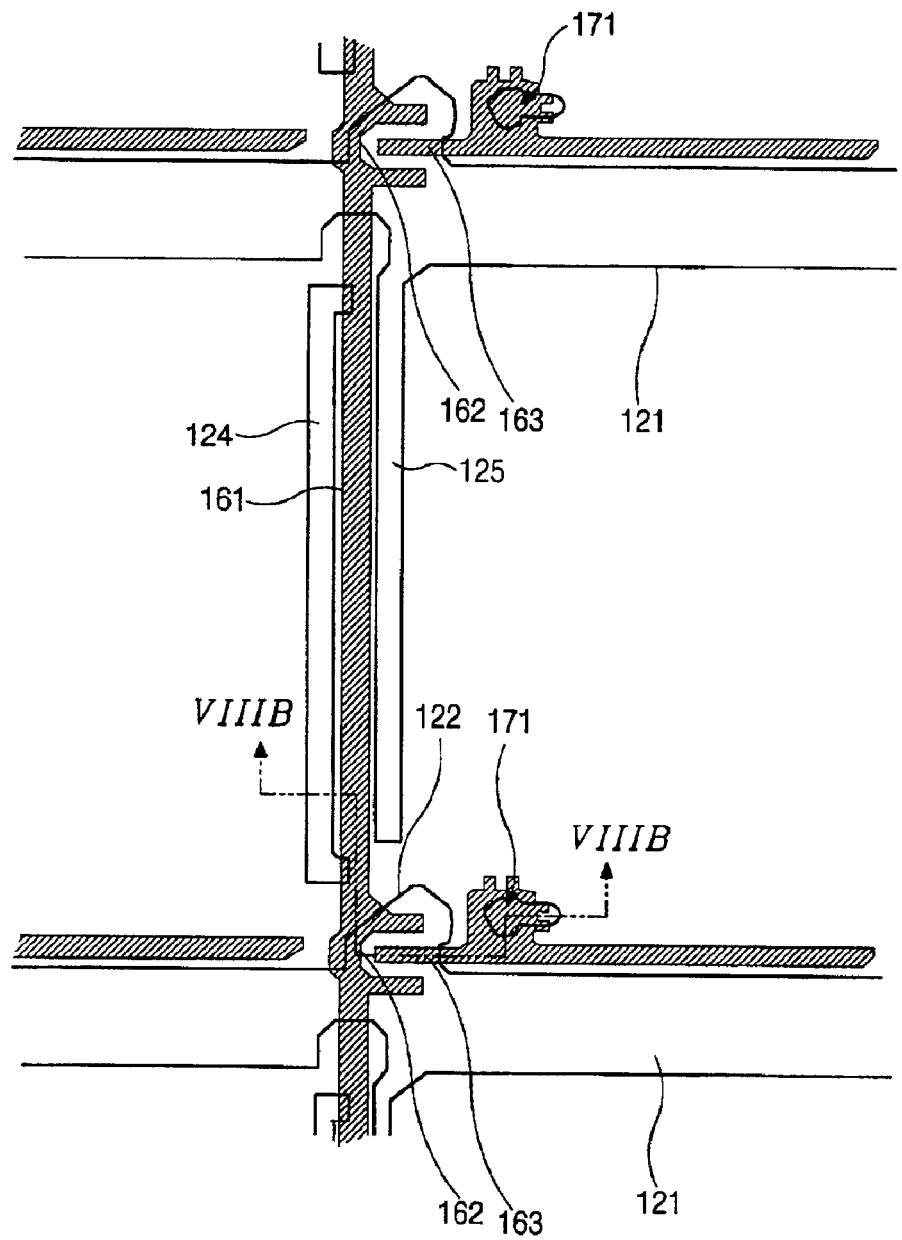
Figure 8B:
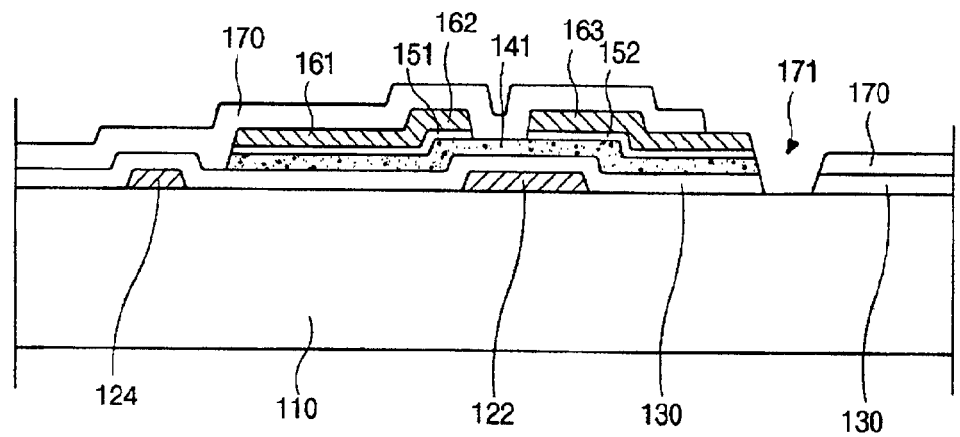

FIGS. 8A and 8B illustrate other step of forming a passivation layer of the array panel according to the present invention. FIG. 8A is a plane view showing the step of forming a passivation of the array panel according to the present invention, and FIG. 8B is a cross-sectional view along line VIIIB—VIIIB of FIG. 8A.

As shown in FIGS. 8A and 8B, an insulating layer is deposited and patterned using the third mask, so that a passivation layer 170 having a contact hole 171 is formed. The passivation layer 170 covers the data line 161, the source electrode 162, and the drain electrode 163. And the contact hole 171 exposes a part of the second part of the drain electrode 163. The passivation layer 170 may be made of an inorganic material, such as silicon oxide and silicon nitride, or an organic material, such as benzocyclobutene (BCB).

Next, as shown in FIGS. 4 and 5, a transparent conductive material is deposited and etched by a photolithography process using the fourth mask. A pixel electrode 181 is then formed on the passivation layer 170. The pixel electrode 181 may be made of a transparent conductive material such as indium tin oxide (ITO). The pixel electrode 181 is connected to the drain electrode 163 through the contact hole 171. The pixel electrode 181 overlaps the gate line 121. Thus, the pixel electrode 181 forms a storage capacitor with the gate line 121. Also, the pixel electrode 181 overlaps the first shielding pattern 124, the second shielding pattern 125, and the first part of the drain electrode 163.

It will be apparent to those skilled in the art that various modifications and variations can be made in the array panel for a liquid crystal display device and the method of manufacturing the same of the present invention without departing from the spirit or scope of the inventions. Thus, it is intended that the present invention covers the modifications and variations of this invention provided they come within the scope of the appended claims and their equivalents.

What is claimed is:

1. A method of manufacturing an array panel for a liquid crystal display device, comprising:

forming a gate line and a gate electrode on a substrate using a first mask;

forming a gate insulating layer, an amorphous silicon layer, a doped amorphous silicon layer, and a metal layer on the substrate in this order;

forming an active layer, an ohmic contact layer, a data line, a source electrode, and a drain electrode using a second mask;

forming a passivation layer using a third mask; and forming a pixel electrode on the passivation layer using a fourth mask, wherein a channel area between the source electrode and the drain electrode has a "U" shape defining two bending portions, and wherein the second mask includes a plurality of blocking patterns and a fine pattern, the blocking patterns corresponding to the data line, the source electrode, and the drain electrode, and the fine pattern corresponding to the channel area, and the blocking patterns and the fine pattern forming first and second slits such that the slit neighboring the drain electrode has widths at the two bending portions narrower than widths at portions between the two bending portions of the first and second slits.

2. The method according to claim 1, the forming the active layer, the ohmic contact layer, the data line, the source electrode, and the drain electrode includes forming a photo-resist patterns having a first pattern corresponding to the data line, the source electrode, and the drain electrode, and a second pattern corresponding to the channel area.

3. The method according to claim 2, wherein the first pattern has a thickness greater than the second pattern.

4. The method according to claim 1, wherein the fine pattern has a width of 1.5 µm.

5. The method according to claim 1, wherein the first and second slits have a width in a range of 1.1 µm to 1.3 µm.

6. The method according to claim 1, wherein the slit neighboring the drain electrode has a corner width of 1.1 µm.

7. The method according to claim 1, wherein the "U" shape is substantially completely symmetrical.

* * * * *